United States Patent Office 3,646,005
Patented Feb. 29, 1972

3,646,005
POLYNUCLEAR AMINES AND PROCESS FOR THE PREPARATION THEREOF
Rene Pierre Victor Roe, Seine Inferieure, and Gerard Thirot, Petit-Quevilly, France, assignors to Ugine Kuhlmann, Paris, France
No Drawing. Filed Mar. 10, 1967, Ser. No. 622,109
Claims priority, application France Mar. 29, 1966, 55,303
Int. Cl. C07c *143/60, 143/66*
U.S. Cl. 260—508                                  10 Claims

ABSTRACT OF THE DISCLOSURE

The present invention relates to a process for the sulphonation of an aromatic or heterocyclic polynuclear amine which comprises treating the amine, dispersed or dissolved in an aqueous solution of a water-soluble salt of sulphurous acid, with an oxidising agent of which the oxidation potential, measured at 20° C. and pH 7 with respect to the normal hydrogen electrode, is between +0.4 and +0.7 volt, the pH of the medium being maintained approximately constant at a value between 3 and 9.5. It also relates to new sulphonated polynuclear amines and to azo dyestuffs having one of the formulae:

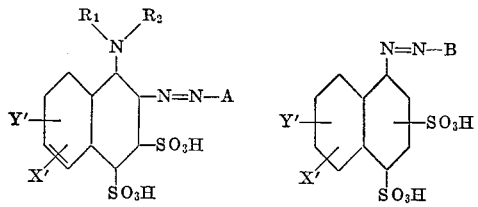

wherein A represents the residue of a diazotisable aromatic or heterocyclic amine, B represents the residue of a coupling compound, $R_1$ represents a hydrogen atom or an alkyl or aryl residue, $R_2$ represents a hydrogen atom or an alkyl residue, and X' and Y' each represent hydrogen or halogen atoms or hydroxy, alkoxy, carboxy, sulpho or

groups.

---

The present invention concerns improvements in and relating to sulphonated polynuclear amines.

A certain number of aromatic amines undergo sulphonation with sodium bisulphite in the presence of an oxidising agent. This reaction, from which the yields of derivatives sulphonated on the carbon are often low, has been described by numerous authors (E. E. Gilbert, "Sulphonation and related reactions, 1965, pp. 166–171). It also leads to oxidation products, N-sulphonated derivatives and often mixtures of such products. The sulphonation of 1-amino-2-naphthol-6-sulphonic acid with sodium sulphite and silver bromide in the presence of sodium carbonate is carried out according to A. Seyewetz with a yield of 60% of the trisulphonic derivative (Bulletin of the French Chemical Society, 1934, I, p. 1520); this method of production, however, cannot be adopted for the commercial manufacture of aromatic amines sulphonated on the nucleus.

According to the present invention it has now been found that it is possible to sulphonate aromatic or heterocyclic polynuclear amines with good yields and in a very selective way, by an industrially applicable process, by treating these amines, dissolved or dispersed in aqueous solutions of water-soluble salts of sulphurous acid, with oxidising agents whose oxidation potential measured at 20° C. and at pH 7 with respect to the normal hydrogen electrode is between +0.4 and +0.7, the pH of the medium being kept approximately constant at a value between 3 and 9.5.

Using, for example, sodium sulphite as the salt of sulphurous acid, the general scheme of the process includes the following reactions:

(1) oxidation of the sulphite into sulphate

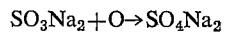
$$SO_3Na_2 + O \rightarrow SO_4Na_2$$

(2) oxidation of the sulphite into dithionate

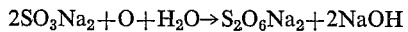
$$2SO_3Na_2 + O + H_2O \rightarrow S_2O_6Na_2 + 2NaOH$$

(3) sulphonation of the amine

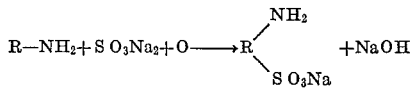

Amines of the naphthalene series may be mentioned first of all as polynuclear amines to which the process of the invention may be applied, especially those of the general formulae:

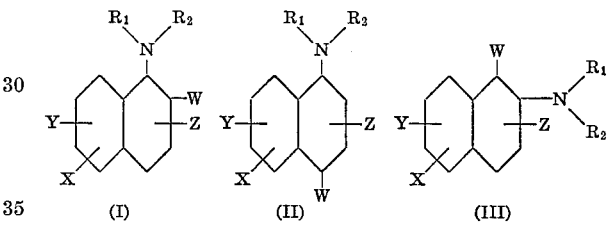

in which $R_1$ represents a hydrogen atom, an alkyl or aryl radical, $R_2$ represents a hydrogen atom or an alkyl radical, W represents a hydrogen atom, X, Y and Z represent hydrogen or halogen atoms, or hydroxy, alkoxy, carboxy, sulpho or

groups, one of them can be an arylazo group

wherein A is the residue of a diazotisable aromatic amine. Anthraquinone amines may also be mentioned.

The process is also applicable to heterocyclic polynuclear amines of a variety of series, for example, those of the pyrazole, thiazole, oxazole, imidazole or triazole series. Among these the amines of the following formulae may be particularly mentioned.

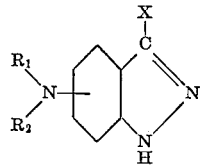
(IV)

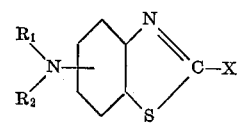
(V)

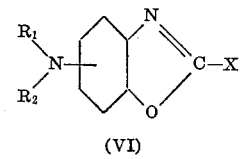
(VI)

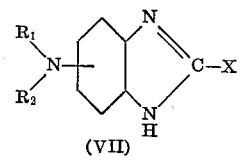
(VII)

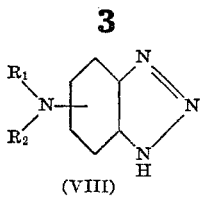

(VIII)

in which $R_1$, $R_2$ and X have the same significance as above.

The process according to the invention may also be used for the sulphonation of the metalliferous complexes of aminoazo dyestuffs.

In order that the sulphonation reaction should develop satisfactorily, it is necessary to keep the pH of the reaction medium at between 3 and 9.5. Although it may be possible to operate at a pH as low as 3 and as high as 9.5, it is nevertheless preferable to choose a pH between 6 and 8.5, between which values the ratio $$\frac{\text{speed of sulphonation}}{\text{speed of oxidation of the sulphurous acid salt}}$$

goes through a maximum. The optimum value of the pH may vary slightly according to the nature of the oxidising system used. In general, lowering the pH accelerates the reactions, but the acceleration is higher for the speeds of oxidation than for the speed of sulphonation and, for the same sulphonation yield, leads to greater consumption of sulphite and oxidising agent. Maintenance of the pH between the aforementioned values may be effected by means of any acid such as for example sulphuric acid, hydrochloric acid or phosphoric acid, but it has been found, according to one of the features of the invention, that it is particularly advantageous to use for this purpose sulphurous acid itself, or better still a concentrated solution of an alkali metal bisulphite (for example a solution containing 20% of $SO_2$). In addition to a total saving in the acids necessary to maintain the pH, this procedure permits a rational utilisation of the sulphurous ions.

All the water-soluble salts of sulphurous acid within the limits of pH indicated above are suitable for the reaction, and are in particular, the sulphites and bisulphites of sodium, potassium and ammonium. Substances capable of liberating sulphurous ions under the operating conditions can also be used, for example sodium, potassium or ammonium pyrosulphites, hydrosulphites or hyposulphites.

Many oxidising agents are capable of oxidising sulphites into sulphates or dithionates; on the other hand, only some are able to bring about the sulphonation of the amines. It has been found in this connection that oxidising systems, the oxidation potential of which, measured at 20° C. at pH 7 with respect to the normal hydrogen electrode, is between +0.4 and +0.7 volt, could bring about the reaction, while those with an oxidation potential as defined above of around 0.6 volt are particularly suitable. For example, manganese dioxide, manganic oxide, lead dioxide, yellow oxide of mercury, black cobalt oxide and the water-soluble or water-insoluble salts of chromic acid may be mentioned. The scope of the invention will not be exceeded by using compounds which although not by themselves having oxidation potentials within the limits indicated, are however capable under the reaction conditions of giving degradation products or chelation products which possess oxidation potentials between +0.4 and +0.7 volt. For example, the alkali metal permanganates have oxidation potentials much higher than +0.7 volt, but their degradation product, manganese dioxide, brings about the sulphonation. In the same way, copper oxide has an oxidation potential less than +0.4, but some of its aminated complexes have a higher potential and can be used.

It is advisable to note that the oxidation potential of an oxidising system most often decreases with an increase of the pH, so that it is possible to control the activity of the system by modifying the pH. Among the oxidising agents which may be used, those with the highest oxidation potentials are still active at high pH values, 9.5 being the maximum pH according to the invention. In the majority of cases, commercial manganese dioxide is found to be the most effective and the most economical oxidising agent. Chromates and bichromates also give good results but are more expensive.

Raising the temperature accelerates the speed of the reaction. Although it may be possible to work in a wide field of temperature, from 0° C. up to boiling, the best results are generally obtained when 80° C. is not exceeded. The working conditions are in fact such that at elevated temperatures, generally above 80° C., the reaction known as "Bücherer's reaction" is able to develop and cause at least partial replacement of the amino groups by hydroxy groups.

The choice of a particular temperature depends on several factors, namely solubility of the amine in the reaction medium, the more or less great aptitude of this amine for sulphonation, the nature of the oxidising agent used, and the stability of the products formed in relation to the oxidising agent or the pH. In the case of amines which are sparingly soluble or insoluble in the reaction medium is it preferable to work in a relatively dilute medium and at high temperature; the addition of a surface-active agent is very often favourable. It is also possible to obtain satisfactory results at low temperature by using a dissolving intermediary such as ethyl alcohol which assists the solution of the amine, but in this case the speeds of reaction are considerably retarded, the alcohols in fact having a marked inhibiting action on the oxidation of the sulphites, while on the other hand the sulphonation is obtained with a lower consumption of reagents, sulphites and oxidising agent.

Of the amino-acids obtained according to the sulphonation process of the invention, a certain number are known, while others are new products. As such may be specially mentioned 1-dimethylamino-naphthalene-4,7-disulphonic acid,
2-monomethyl-amino-naphthalene-1,5,7-trisulphonic acid,
1-amino-7-naphthol-2,4-disulphonic acid,
2-methylamino-5-naphthol-1,7-disulphonic acid,
2-phenyl-amino-5-naphthol-1,7-disulphonic acid,
4'-methoxy-2-phenyl-amino-5-naphthol-1,7-disulphonic acid,
1-naphthylamino-2-methoxy-4,6-disulphonic acid,
1-naphthylamino-2-ethoxy-4,6-disulphonic acid,
2-amino-7-carboxy-6-naphthol-1-sulphonic acid,
2-amino-7-naphthol-1-sulphonic acid, and acids of the general formula:

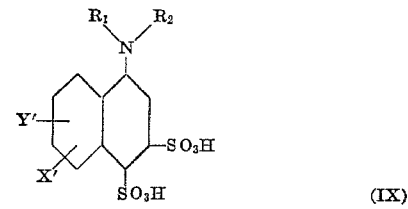

(IX)

in which X' and Y' each represent hydrogen or halogen atoms or hydroxy, alkoxy, carboxy, sulpho or

groups. These amino-acid compounds may be used, for example, as diazotisable bases or as coupling compounds for the preparation of azo dyestuffs. The compounds of Formula IX are valuable intermediates for the preparation of azo dyestuffs of the following formulae:

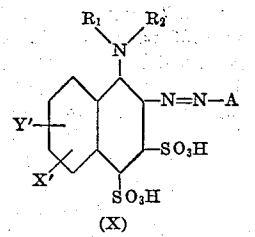 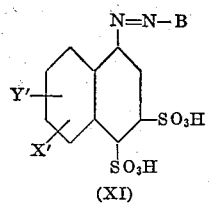

in which A represents the residue of a diazotisable aromatic or heterocyclic amine and B represents the residue of any coupling compound. The residue A may belong to various series such as for example the following: benzene, diphenyl, diphenyl-alkane, benzene-azo-benzene, stilbene, naphthalene, anthracene, quinoline, indazole, imidazole, benzoxazole, benzimidazole, thiazole, benzothiazole, pyrazole, or triazole.

The invention is illustrated by, but not limited to, the following examples in which the parts indicated are parts by weight unless the contrary is stated.

EXAMPLE 1

148 parts of α-naphthylamine were dissolved in 600 parts by volume of lukewarm ethyl alcohol, and the solution obtained was dispersed with good stirring in a solution containing 3000 parts of hot water, 400 parts by volume of a solution of sodium bisulphite with 32% of $SO_2$, and 40 parts of 100% caustic soda. The mixture was heated to 70° C. and 40 parts of commercial 83% manganese dioxide were introduced. The pH of the mixture rapidly increased, and it was maintained at between 6.5 and 7.5 by the discontinuous or continuous introduction of a solution of sodium bisulphite containing 32% of $SO_2$.

When the variations in pH become very small, a further 40 parts of manganese dioxide and a sufficient amount of sodium bisulphite for continuous stabilisation of the pH between the values indicated were introduced. This operation was repeated as many times as were necessary to obtain the complete sulphonation of the α-naphthylamine. The progress of the sulphonation can easily be followed by paper chromatography. The sulphonation was finished in 16 to 20 hours at 70° C. for a total consumption of 240 parts of commercial 83% manganese dioxide and 950 parts by volume of a solution of sodium bisulphite containing 32% of $SO_2$ (including the 400 parts used initially).

The alcohol was removed by distillation or steam distillation, then the product was filtered to remove the insoluble particles from the commercial manganese dioxide as well as the insoluble manganese salts which are found in the mixture principally in the form of pyrosulphite. The insoluble matter was washed with boiling water to extract all water-soluble organic material. The filtrates were acidified with excess sulphuric or hydrochloric acid, and then heated at 80° C. until sulphurous acid was completely eliminated. Removal of the latter can be accelerated by bubbling in air or nitrogen. The precipitate formed was filtered off at the ambient temperature and dried.

180 parts of 1-amino-naphthalene-4-sulphonic acid were thus obtained which was very pure and free from isomers. The yield was 80% calculated on the α-naphthylamine used.

EXAMPLE 2

This was operated as in Example 1, but in the absence of ethyl alcohol as the dissolving intermediary. The total consumption of manganese dioxide rose to 400 parts and that of sodium bisulphite in the form of a 32% solution to 1600 parts by volume. The sulphonation was effected in 20 hours at 70° C. The yield of 1-amino-naphthalene-4-sulphonic acid was 65%.

EXAMPLE 3

On replacing the α-naphthylamine in Example 1 by β-naphthylamine, under the same conditions 2-amino-naphthalene-1-sulphonic acid was obtained with yields above 70%.

EXAMPLE 4

On replacing the α-naphthylamine in Example 2 by β-naphthylamine, under the same conditions 2-amino-naphthalene-1-sulphonic acid was obtained with yields of the order of 60%.

EXAMPLE 5

Starting from 8-chloro-1-naphthylamine and operating as in Example 1, under similar conditions 8-chloro-1-amino-naphthalene-4-sulphonic acid was obtained with a yield of 55%.

EXAMPLE 6

245 parts of the sodium salt of 1-amino-naphthalene-5-sulphonic acid were dissolved in 1500 parts of lukewarm water, and 250 parts by volume of a solution of sodium bisulphite containing 32% of $SO_2$ were added and the temperature was raised to 70° C. 50 parts of 83% commercial manganese dioxide were added and a solution of sodium bisulphite (32% of $SO_2$) was simultaneously introduced so as to maintain the pH of the solution between 6.5 and 7.5. When the pH varied no longer and while the sulphonation was not finished (which is easily detected by paper chromatography), fresh portions of 50 parts of manganese dioxide as well as the amounts of bisulphite necessary to maintain the pH at between 6.5 and 7.5 were introduced. The sulphonation was finished after 100 hours at 70° C. during which a total of 450 parts of commercial 83% manganese dioxide and about 2000 parts by volume of sodium bisulphite (32% of $SO_2$) were consumed.

The product was filtered at 70° C. to remove the insoluble manganese salts, chiefly manganese pyrosulphite, as well as the impurities in manganese dioxide. The insoluble material was washed with hot water to extract the sulphonated products. The filtrates were treated at a temperature of 70–75° C. with excess sulphuric or hydrochloric acid in order to eliminate all of the sulphurous acid, this elimination being accelerated by bubbling through air or nitrogen. The precipitation was finished by salting out with sodium chloride at the rate of 10% by volume, and the mixture was left to cool and filtered.

260 parts of the monosodium salt of 1-amino-naphthalene-2,5-disulphonic acid not containing any isomer was obtained, say a yield of 80% wtih respect to the 1-amino-naphthalene-5-sulphonic acid used.

EXAMPLE 7

On replacing the sodium salt of 1-amino-naphthalene-5-sulphonic acid in Example 6 by the sodium salt of 1-amino-naphthalene-6-sulphonic acid, a complete sulponation was obtained in 6 hours at 45° C. for a consumption of 140 parts of commercial manganese dioxide and 1,125 parts by volume of sodium bisulphite (32% of $SO_2$).

1-amino-naphthalene-4,6-disulphonic acid was isolated as the monopotassium salt by the addition of potassium chloride to its acid solution freed from sulphurous acid. The yield, calculated on the initial sulphonic acid, was of the order of 83%.

EXAMPLE 8

Operating as in Example 6, 245 parts of the sodium salt of 1-amino-naphthalene-7-sulphonic acid were treated with 225 parts of commercial manganese dioxide and 1500 parts by volume of sodium bisulphite (32% of $SO_2$). The sulphonation was complete in 30 hours at a temperature of 40–42° C. The sodium salt of 1-amino-naphthalene-4,7-disulphonic acid was finally isolated with a yield of 85% calculated on the starting substance.

EXAMPLE 9

On replacing the sodium salt of 1-amino-naphthalene-5-sulphonic acid in Example 6 by the sodium salt of 1-amino-naphthalene-8-sulphonic acid, a complete sulphonation was obtained in 8 hours at 70° C. for a consumption of 250 parts of commercial manganese dioxide and 1400 parts by volume of sodium bisulphite (32% of $SO_2$).

1-amino-naphthalene-4,8-disulphonic acid was isolated as the monopotassium salt by salting out with potassium chloride from its acid solution freed from sulphurous acid. The yield was of the order of 85% calculated on the initial sulphonic acid.

EXAMPLE 10

If the 1-amino-naphthalene-7-sulphonic acid in Example 8 was replaced by its N-dimethyl derivative, the sulphonation was effected in 20 hours at 55° C. for a consumption of 300 parts of commercial manganese dioxide and 1900 parts by volume of sodium bisulphite (32% of $SO_2$).

The final salting out with potassium chloride enabled the monopotassium salt of 1-dimethylamino-naphthalene-4,7-disulphonic acid to be isolated with a yield over 70%.

This product is identical with that obtained by the action of 1-hydroxy-naphthalene-4,7-disulphonic acid with dimethylene according to the Bücherer reaction.

EXAMPLE 11

Operating as in Example 6, 245 parts of the sodium salt of 2-amino-naphthalene-5-sulphonic acid were treated with 240 parts of commercial 83% manganese dioxide and 1100 parts by volume of sodium bisulphite (32% of $SO_2$). A practically quantitative sulphonation was obtained in 30 hours at 60–65° C. The monosodium salt of 2-amino-naphthalene-1,5-disulphonic acid was isolated with a yield of 91% calculated on the initial amine.

EXAMPLE 12

Under conditions similar to those of Example 6, 245 parts of the sodium salt of 2-amino-naphthalene-6-sulphonic acid were treated with 240 parts of 83% manganese dioxide and 850 parts by volume of sodium bisulphite (32% of $SO_2$). A quantitative sulphonation was obtained in 45 hours at 65° C. The monosodium salt of 2-amino-naphthalene-1,6-disulphonic acid was finally isolated with a yield of 96% calculated on the 2-amino-naphthalene-6-sulphonic acid used.

EXAMPLE 13

On replacing the sodium salt of 2-amino-naphthalene-6-sulphonic acid in Example 12 by the sodium salt of 2-amino-naphthalene-7-sulphonic acid, and under the same conditions and with the same quantities of reagents, the monosodium salt of 2-amino-naphthalene-1,7-disulphonic acid was obtained with a yield of 98% calculated on the initial amine.

EXAMPLE 14

Operating as in Example 6, but treating 347 parts of the disodium salt of 2-amino-naphthalene-5,7-disulphonic acid at 60° C. with 260 parts of manganese dioxide and 1100 parts by volume of sodium bisulphite (32% of $SO_2$), the disodium salt of 2-amino naphthalene-1,5,7-trisulphonic acid was obtained (yield 90% in solution).

EXAMPLE 15

Operating as in Example 6, 363 parts of the disodium salt of 2-monomethylamino-naphthalene-5,7-disulphonic acid were treated with 240 parts of commercial manganese dioxide and 850 parts by volume of sodium bisulphite (32% of $SO_2$). The amine was quantitatively sulphonated in 20 hours at 60° C. The disodium salt of 2-monomethylamino-naphthalene - 1,5,7 - trisulphonic acid identical with that obtained by sulphonating N-methyl Tobias acid was isolated by salting out, in a yield of 65%.

EXAMPLE 16

On treating, under the conditions of Example 6, 181 parts of the sodium salt of 1-amino-7-naphthol with 240 parts of manganese dioxide and 1500 parts by volume of sodium bisulphite (32% of $SO_2$) for 4 hours at 55° C. it was found that no trace of the 1-amino-7-naphthol initially used remained. After acidification to eliminate the sulphurous acid from the solution, a precipitate of 1-amino-7-naphthol-4-sulphonic acid was first formed with a yield of the order of 60%; then after salting out and complementary acidification of the mother liquor, the monosodium salt of 1-amino-7-naphthol-2,4-disulphonic acid was isolated with a yield of the order of 25%.

EXAMPLE 17

On treating, under the conditions of Example 6, 181 parts of the sodium salt of 1-amino-6-naphthol with 400 parts of manganese dioxide and 2500 parts by volume of sodium bisulphite (32% of $SO_2$) for 10 hours at 45–50° C. it was found that no trace of the 1-amino-6-naphthol initially used remained.

After removing the insoluble manganese salts, acidification of the filtrate enabled 1-amino-6-naphthol-4-sulphonic acid, identical with that obtained by fusion of 1-amino-naphthalene-4,6-disulphonic acid, to be isolated, with a yield of 60%.

EXAMPLE 18

If 181 parts of the sodium salt of 2-amino-7-naphthol were treated with 300 parts of commercial manganese dioxide and 2900 parts by volume of sodium bisulphite (32% of $SO_2$) under the conditions of Example 6, the sulphonation was obtained in 44 hours at 65° C. After removing insoluble manganese salts, acidification of the filtrate enabled 2-amino-7-naphthol-1-sulphonic acid to be isolated with a yield of 80% calculated on the initial substance.

EXAMPLE 19

If 261 parts of the sodium salt of 2-amino-5-hydroxy-naphthalene-7-sulphonic acid were treated with 180 parts of commercial manganese dioxide and 1130 parts by volume of sodium bisulphite (32% of $SO_2$) under the conditions of Example 6, the sulphonation was obtained in 7 hours at 45° C. The monopotassium salt of 2-amino-5-hydroxy-naphthalene-1,7-disulphonic acid was obtained by salting out with potassium chloride, with a yield over 85% calculated on the starting substance.

EXAMPLE 20

If the sodium salt of 2-amino-5-hydroxy-naphthalene-7-sulphonic acid in Example 19 was replaced by the sodium salt of its N-monomethyl derivative, under the same conditions the monopotassium salt of 2-monomethyl-amino-5-naphthol-1,7-disulphonic acid was obtained with a yield of over 65%. This salt was identical with the product obtained by alkaline fusion of 2-N-methylamino-naphthalene-1,5,7-trisulphonic acid.

EXAMPLE 21

On treating 327 parts of the sodium salt of 2-phenyl-amino-5-naphthol-7-sulphonic acid with 300 parts of manganese dioxide and 1700 parts by volume of sodium bisulphite, under the conditions of Example 6, for 10 hours at 55° C. a neutral solution containing 412 parts of the sodium salt of 2-phenylamino-5-naphthol-1,7-disulphonic acid was finally obtained, representing a yield of 96%. The sulphonic group in position 1 was very labile and was rapidly removed in acid medium.

EXAMPLE 22

One operates as in Example 21 but 4'-methoxy-2-phenylamino-5-naphthol-7-sulphonic acid was used and the sulphonation was carried out at 40° C. 4'-methoxy-2-phenylamino-5-naphthol-1,7-disulphonic acid was obtained in solution with a yield of 80%. The sulphonic group in position 1 was very labile and was removed in acid medium.

EXAMPLE 23

Under the conditions of Example 6, 275 parts of the sodium salt of 1 - amino-2-methoxy-naphthalene-6-sulphonic acid were treated with 200 parts of commercial manganese dioxide and 850 parts by volume of sodium bisulphite (32% of $SO_2$). The sulphonation was effected quantitatively in 1½ hours at 45° C. The monosodium salt of 1 - amino-2-methoxy-naphthalene-4,6-disulphonic acid was precipitated by salting out. The yield was 96% calculated on the starting amine.

EXAMPLE 24

Under the conditions of Example 6, 289 parts of the sodium salt of 1-amino-2-ethoxy-naphthalene-6-sulphonic acid were treated with 235 parts of manganese dioxide and 1050 parts by volume of bisulphite (32% of $SO_2$). The sulphonation was complete in 32 hours at 45° C. The monosodium salt of 1-amino-2-ethoxy-naphthalene-4,6-disulphonic acid was precipitated by salting out. The yield was 92% calculated on the initial amine.

EXAMPLE 25

Under the conditions of Example 6, 225 parts of the sodium salt of 2-amino - 6 - hydroxy-naphthalene-7-carboxylic acid were treated with 200 parts of manganese dioxide and 1800 parts by volume of sodium bisulphite (32% of $SO_2$). The sulphonation was complete in 2 hours at 50° C. 2 - amino - 6-hydroxy-7-carboxy-naphthalene-1-sulphonic acid was obtained with a yield of 75%.

EXAMPLE 26

261 parts of the sodium salt of 2-amino-5-hydroxy-naphthalene-7-sulphonic acid were dissolved in 1600 parts of lukewarm water containing 400 parts of anhydrous neutral sodium sulphite. The mixture was heated to 60° C. sulphonated by introducing, in fractions of 50 parts, 260 parts of commercial 83% manganese dioxide in a period of 48 hours, while maintaining the pH of the solution at between 6.8 and 8.0 by the addition of a 35% solution of sulphuric acid; about 350 parts by volume were required.

The process was finished as in Example 6 and the monopotassium salt of 2-amino-5-hydroxy-naphthalene-1,7-disulphonic acid was isolated with a yield of 70% calculated on the starting substance, the precipitation being effected by means of potassium chloride.

EXAMPLE 27

On replacing the sodium bisulphite in Example 19 by the equivalent quantity of a solution of potassium bisulphite (20% of $SO_2$), and under the same conditions, the monopotassium salt of 2-amino-5-hydroxy-naphthalene-1,7-disulphonic acid was obtained. Yield 85%.

EXAMPLE 28

On replacing the sodium bisulphite in Example 19 by the equivalent quantity of a solution of ammonium bisulphite (20% of $SO_2$), and under analogous conditions, the monopotassium salt of 2-amino-5-hydroxy-naphthalene-1,7-disulphonic acid was obtained with a yield of 60%.

EXAMPLE 29

On replacing the 400 parts of anhydrous neutral sodium sulphite in Example 26 by 340 parts of sodium hydrosulphite, and under the same conditions, the monopotassium salts of 2-amino-5-hydroxy-naphthalene-1,7-disulphonic acid was obtained with a yield of the order of 70%, calculated on the starting substance.

EXAMPLE 30

On replacing the 400 parts of neutral sodium sulphite in Example 26 by 450 parts of sodium metabisulphite, and under the same conditions, the potassium salt of 2-amino-5-hydroxy-naphthalene-1,7-disulphonic acid was obtained with a yield of 70%.

EXAMPLE 31

The process was carried out as in Example 29, but a solution of sodium bisulphite was used instead of a solution of sulphuric acid to keep the pH at between 6.8 and 8.0. The monopotassium salt of 2-amino-5-hydroxy-naphthalene-1,7 - disulphonic acid was obtained with a yield of over 70%.

EXAMPLE 32

253 parts of 1-amino-2-methoxy-naphthalene-6-sulphonic acid were dissolved in a solution containing 1500 parts of lukewarm water and 1000 parts by volume of a solution of sodium bisulphite (32% of $SO_2$) with the aid of about 400 parts by volume of a solution of 35% caustic soda so that the pH of the solution was between 7 and 7.5.

The mixture was heated to 45° C. and 500 parts by volume of a solution containing 288 parts of sodium dichromate were slowly introduced while the pH was kept within the limits 7 to 7.5 by the simultaneous addition of about 800 parts by volume of a solution of sodium bisulphite (32% of $SO_2$). The speed at which the oxidising solution was run in was regulated so that the exothermy of the reaction maintained the temperature at between 45° C. and 50° C.

When the reaction was complete, the precipitated chromium oxide was filtered off. The filtrate was treated at 85° C. with excess of hydrochloric acid until sulphurous acid was completely eliminated. The soluble chromium salts were precipitated by the introduction of sodium carbonate up to pH 9 and then removed by filtration.

Finally 10% of sodium chloride was added to the filtrate, then the mixture was made strongly acid with hydrochloric acid. The monosidium salt of 1-amino-2-methoxy-naphthalene-4,6-disulphonic acid rapidly crystallised, and after cooling and isolation, it was obtained with a yield of the order of 90%, calculated on the initial substance.

EXAMPLE 33

When operating under the same conditions as in Example 32, but replacing the sodium dichromate with ammonium dichromate, the monosodium salt of 1-amino-2-methoxy-naphthalene-4,6-disulphonic acid was obtained with a yield of 85%.

EXAMPLE 34

On operating under the conditions of Example 32, but starting from 223 parts of 1-amino - naphthalene-6-sulphonic acid, a yield of the order of 80% of the corresponding 4,6-disulphonic acid was obtained in the form of the monopotassium salt, the final salting out being effected by potassium chloride.

EXAMPLE 35

If under the conditions of Example 34 the solution of sodium dichromate was replaced by an equivalent quantity of a saturated solution of potassium dichromate, exactly the same results were obtained.

EXAMPLE 36

133 parts of 6-amino-indazole were made into a paste in 6000 parts of hot water, then 500 parts by volume of a 32% solution of sodium bisulphite, then 800 parts of crystalline neutral sodium sulphite were added. 400 parts of manganese dioxide were introduced in fractions of 50 parts in 20 hours at 60° C. while the necessary quantities of sodium bisulphite to maintain the pH at between 7 and 7.5 were introduced, i.e. about 1600 parts by volume of 32% solution. The sulphonation was quantitative. The manganese salts were made insoluble by the addition of sodium carbonate to a pH of 9, then removed by filtration. The filtrate was treated at 85° C. with excess of hydrochloric acid until the sulphurous acid was completely removed, and 6-amino-indazole-7-sulphonic acid was allowed to crystallise by cooling. Yield: 85%.

EXAMPLE 37

On operating under the same conditions as in Example 36 but starting from 5-amino-indazole, a monosulphonated derivative of 5-amino-indazole was obtained which was very probably 5-amino-indazole-4-sulphonic acid. Yield: 70%.

EXAMPLE 38

Under the conditions of Example 36 but starting from 3-chloro-6-amino-indazole, 3-chloro-6-amino - indazole-7 sulphonic acid was obtained. Yield: 75%.

EXAMPLE 39

Under the conditions of Example 36, but starting from 3-chloro-5-amino-indazole, a sulphonated derivative was obtained which was probably 3-chloro-5-amino-indazole-4-sulphonic acid. Yield: 60%.

EXAMPLE 40

Under the conditions of Example 36, but starting from 2-chloro-6-amino-benzothiazole, a sulphonated derivative was obtained with a good yield which was probably 2-chloro-6-amino - benzothiazole-7-sulphonic acid. Yield 60%.

EXAMPLE 41

If under the conditions of Examples 1 or 2- α-naphthylamine was replaced by α-amino-anthraquinone, 1-amino-anthraquinone-2-sulphonic acid was obtained.

EXAMPLE 42

200 parts of 1-amino-naphthalene-3-sulphonic acid were dissolved in 1500 parts of water. 100 parts of a solution of sodium bisulphite (32% of $SO_2$) were added, then, after neutralisation of the solution to pH 7.3 by addition of a 35° Bé solution of caustic soda, 300 parts of manganese dioxide were added at 60° C. with good stirring. The pH was kept at its initial value by the addition of sodium bisulphite solution. During the reaction 200 parts of manganese dioxide were again added in two separate portions. The total amount of bisulphite required was about 2800 parts by volume. The reaction mass was then heated for 5 minutes at 95–100° C. and immediately filtered. On cooling the mother liquor, 360 parts of the disodium salt of 1-amino-naphthalene-3,4-disulphonic acid were obtained. A further 90 parts of a mixture of mineral salts and disulphonic acid could be recovered by concentrating the mother liquors. 83 parts of a mixture of mono- and di-sulphonic acids could be recovered by acidifying the solution and could be recycled. The yield after determining the proportions by diazotisation of the products obtained was 65% on the monosulphonic acid used without recycling and 87% after recycling.

1 - amino-naphthalene-3,4-disulphonic acid was identified in the following way:

(1) Analysis of the dyestuff obtained by diazotisation by the inverse method and coupling with betanaphthol $C_{20}H_{12}N_2O_7S_2Na_2$, 4.7 $H_2O$. Found: C, 40.97, 4.01; N, 4.89; S, 10.85; Na, 7.76; $H_2O$, 14.40. Calculated: C, 40.95; H, 3.65; N, 4.78; S, 10.92; Na, 7.85; $H_2O$, 14.40.

(2) 1 - amino-naphthalene-3,4-disulphonic acid was diazotised by the inverse method. The insoluble diazo derivative was isolated and treated with an aqueous solution containing 20% by volume hypophosphorous acid. The sodium salt of the 1,2-disulphonic acid thus formed was isolated after partial evaporation of the solution. After drying, this salt was treated with phosphorous pentachloride in the presence of phosphorous oxychloride. After running on to ice, drying and recrystallising from benzene, a product was obtained which on analysis corresponded with the empirical formula: $C_{10}H_6O_5S_2$. Calculated (percent): C, 44.4; H, 2.22; S, 23.7. Found (percent): C, 44.31; H, 2.50; S, 23.31.

It is known that the treatment of naphthalene-2,3-disulphonic acid with phosphorus pentachloride gives the corresponding 2,3-disulphochloride (P. Petitcolas et al., Bull. Soc. Chim., 1962, 407), while naphthalene-1,2-disulphonic acid gives the internal anhydride (Armstrong and Wynne, Chem. News, 67, 299). On the other hand, the melting points of the product obtained, $C_{10}H_6O_5S_2$, and of an authentic sample of the internal anhydride of naphthalene-1,2-disulphonic acid have been compared:

|  | ° C. |
|---|---|
| M.P. of the reference sample | 198 |
| M.P. of the product obtained | 198 |
| M.P. of the mixture of the 2 products | 198 |

A comparison with naphthalene - 2,3-disulphochloride has also been made:

|  | ° C. |
|---|---|
| M.P. of the disulphochloride | 212 |
| M.P. of the mixture with the product obtained | 178 |

1 - amino-naphthalene-3,4-disulphonic acid, diazotised and coupled with 1-amino-naphthalene-7-sulphonic acid, gives a violet-red dyestuff in acid medium and orange-yellow in alkaline medium. When coupled with the diazo derivative of para-nitraniline it gives a purplish-red dyestuff in acid medium and a brown-red in neutral or alkaline medium.

1 - amino-naphthalene-3,4-disulphonic acid was separated from the 1-amino-naphthalene-3-sulphonic acid by paper chromatography using a 0.2% aqueous solution of sodium carbonate and 10% of sodium chloride as eluant. On the development of the chromatogram in sodium acetate medium by the diazo derivative of paranitraniline, the two dyestuffs obtained on the chromatogram were different, the dyestuffs derived from the disulphonic acid being bathochromed with respect to the dyestuff derived from the monosulphonic acid.

EXAMPLE 43

On operating as in Example 42 and replacing 1-amino-naphthalene-3-sulphonic acid by 1-amino-7-hydroxy-naphthalene-3-sulphonic acid, 1-amino-7-hydroxy-naphthalene-3,4-disulphonic acid was obtained with a yield of 20%.

EXAMPLE 44

The process was carried out as in Example 43, the manganese dioxide being replaced by manganese sesquioxide or an insoluble chromate namely zinc chromate, aluminium chromate or chromic chromate. The yield of disulphonic acid was improved.

EXAMPLE 45

The process was carried out as in Example 43, starting from 1-amino-6-hydroxy-naphthalene-3-sulphonic acid. 1-amino - 6-hydroxy-naphthalene-3,4-disulphonic acid was obtained with good yields.

EXAMPLE 46

33 parts of the dyestuff obtained by coupling the diazo derivative of 1-amino-2-naphthol-5-sulphonic acid with 6-amino-1-naphthol-3-sulphonic acid were dissolved in 500 parts of water containing 50 parts of a solution of sodium bisulphite (32% of $SO_2$); the solution was taken to pH 6.5 by the addition of a solution of caustic soda of 35° Bé.

10 parts of commercial 83% manganese dioxide were introduced and the pH was maintained at between 6.5 and 7 by the addition of 25 parts of bisulphite. The reaction finished in about 2 hours. After removal of the manganese sludge by filtration, the solution was salted out with 75 parts of potassium chloride. [5-sulpho-2-hydroxy-naphthalene]-<1 azo 2>-[6 - amino-3,5-disulpho-1-hydroxy-naphthalene] was obtained with a yield of 90%.

This dyestuff was in every way identical with that obtained by coupling the diazo derivative of 1 - amino-2-naphthol - 5 - sulphonic acid with 1-naphthol-6-amino-3,5-disulphonic acid.

EXAMPLE 47

Operating under the conditions described in Example 46 and replacing the initial azo dyestuff by its complex with copper, cobalt or chromium, trisulphonated complexes corresponding to the non-metallised trisulphonated dyestuff of Example 46 were obtained.

EXAMPLE 48

The dyestuff obtained by coupling the azo derivative of 5 - sulpho - 2-amino-benzoic acid with 6-amino-1-hydroxy-naphthalene-3-sulphonic acid was sulphonated as in Example 46. 2'-carboxy-2-phenylazo-1-hydroxy-3,5,4'-trisulpho-6-amino-naphthalene was isolated by acidification of the mother liquor from the sulphonation after removal of manganese sludge.

The dyestuff obtained was identical with that obtained by coupling the diazo derivative of 5-sulpho-anthranilic acid with 6-amino-1-naphthol-3,5-disulphonic acid.

EXAMPLE 49

On operating under the conditions of Example 46 with the dyestuff resulting from coupling the diazo derivative of 4-amino-benzene-sulphonic acid with 6-amino-1-naphthol-3-sulphonic acid, 2-phenylazo-1-hydroxy-3,5,4'-trisulpho-6-amino-naphthalene was obtained.

EXAMPLE 50

15 parts of 3'-sulpho-1-phenylazo-2-hydroxy-8-amino-naphthalene were dissolved in 250 parts of water. The solution was neutralised to a pH of 6.5 by the addition of a solution of 35° Bé caustic soda.

10 parts of manganese dioxide, and 10 parts of a solution of sodium bisulphite (32% of SO₂) were added, then the pH of the soltuion was adjusted to about 6.5 by the introduction of 90 parts of bisulphite. When the consumption of bisulphite slackened, a further 10 parts of manganese dioxide were added until none of the initial dyestuff remained. Sodium carbonate was added to the sulphonation product at ordinary room temperature so as to bring the pH to 10, and the manganese sludge was filtered off. 5 parts of 35° Bé caustic soda were added to the solution obtained to destroy an intermediate sulphite compound which had formed. 25 parts of sodium chloride were added and the mixture was acidified by the addition of concentrated hydrochloric acid until it turned Congo paper blue, and it was then heated to boiling to drive off the sulphur dioxide. The dyestuff was precipitated, 1 - phenylazo - 2 - hydroxy-8-amino-naphthalene-5,7,3'-trisulphonic acid being thus isolated. An intermediate disulphonated derivative was forced which was further sulphonated as it was formed.

EXAMPLE 51

On operating as in Example 50 with 1-phenylazo-2-hydroxy-8-amino-naphthalene - 2',5' - disulphonic acid, 1 - phenylazo - 2 - hydroxy - 8 - amino - naphthalene-5,7,2',5'-tetrasulphonic acid was obtained.

A trisulphonated derivative was first formed which was further sulphonated at it was formed.

We claim:
1. Acid represented by the formula:

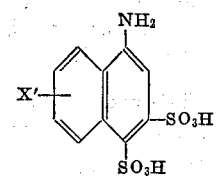

wherein X' is hydrogen or hydroxy.

2. Process for the sulphonation of anaphthalenic amine having one of the following formulae:

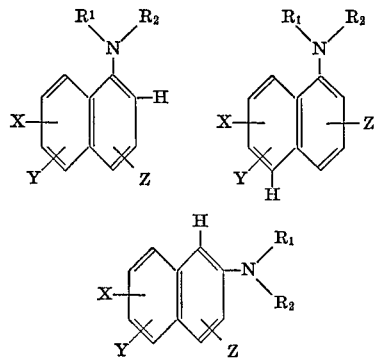

wherein $R_1$ is hydrogen, methyl, phenyl or 4-methoxyphenyl, $R_2$ is hydrogen or methyl, X, Y and Z each are hydrogen, halogen, hydroxy, methoxy, ethoxy, carboxy, sulpho or

which comprises treating the said naphthalenic amine, dispersed or dissolved in an aqueous solution of a sodium, potassium or ammonium salt of sulphurous acid, with an oxidizing agent of which the oxidation potential, measured at 20° C. and pH 7 with respect to the normal hydrogen electrode, is between +0.4 and 0.7 volt, the pH of the medium being maintained approximately constant at a value between 3 and 9.5.

3. Process according to claim 2 wherein the oxidizing agent is manganese dioxide, manganese oxide, lead dioxide, yellow oxide of mercury, black cobalt oxide, chromic acid, sodium dichromate, potassium dichromate, ammonium dichromate, zinc chromate, aluminium chromate, or chromic chromate.

4. Process according to claim 2 wherein the oxidising agent is manganese dioxide which is formed in the reaction medium by decomposition of an alkali metal permanganate.

5. Process according to claim 2 wherein the oxidising agent has an oxidation potential of about +0.6 volts.

6. Process according to claim 2 wherein the pH of the medium is kept approximately constant at a value between 6 and 8.5.

7. Process according to claim 2 wherein the sulphonation takes place at between 0° C. and 80° C.

8. Process acording to claim 2 wherein the sulphurous acid salt used is a sodium, potassium or ammonium sulphite, bisulphite, pyrosulphite, hydrosulphite or hyposulphite alone or mixtures thereof.

9. Process acording to claim 2 wherein the pH is kept approximately constant at between the values given in claim 2 by the introduction of a mineral acid.

10. Process according to claim 2 wherein the pH is kept approximately constant at between the values given in claim 2 by the introduction of sulphurous acid or a soltuion of an alkali metal bisulphite.

References Cited

UNITED STATES PATENTS

| | | | |
|---|---|---|---|
| 2,065,593 | 12/1936 | Lubs | 260—508 |
| 2,124,863 | 7/1938 | Sieglitz | 260—508 |
| 2,365,638 | 12/1944 | Hennion | 260—508 X |
| 2,734,051 | 2/1956 | Iselin | 260—508 X |
| 2,820,783 | 1/1958 | Rait | 508 X |
| 2,945,022 | 7/1960 | Fasciati et al. | 260—508 X |
| 3,294,838 | 12/1966 | Morrison | 260—505 |
| 1,573,056 | 2/1926 | Gubelmann et al. | 260—509 |
| 2,424,066 | 7/1947 | Straub et al. | 260—148 X |

OTHER REFERENCES

Ephraim, "Inorgnaic Chemistry," 4th edition, p. 553 (1947).

Houber-Weyl, "Methoden Der Organischen Chemie, volume 9, pp. 517 to 519 (1952).

Beilstein, "Handbuch Der Organischen Chemie," volume 14, p. 783 (1931).

FLOYD DALE HIGEL, Primary Examiner

U.S. Cl. X.R.

260—150, 151, 155, 157, 158, 162, 190, 191, 195, 196, 198, 304, 307 R, 308 R, 309.2, 310 R, 371, 507 R, 509